No. 777,919. PATENTED DEC. 20, 1904.
H. A. RANDALL.
CONVERTIBLE HAMMOCK AND HAMMOCK CHAIR.
APPLICATION FILED APR. 7, 1903.
NO MODEL.
2 SHEETS—SHEET 1.
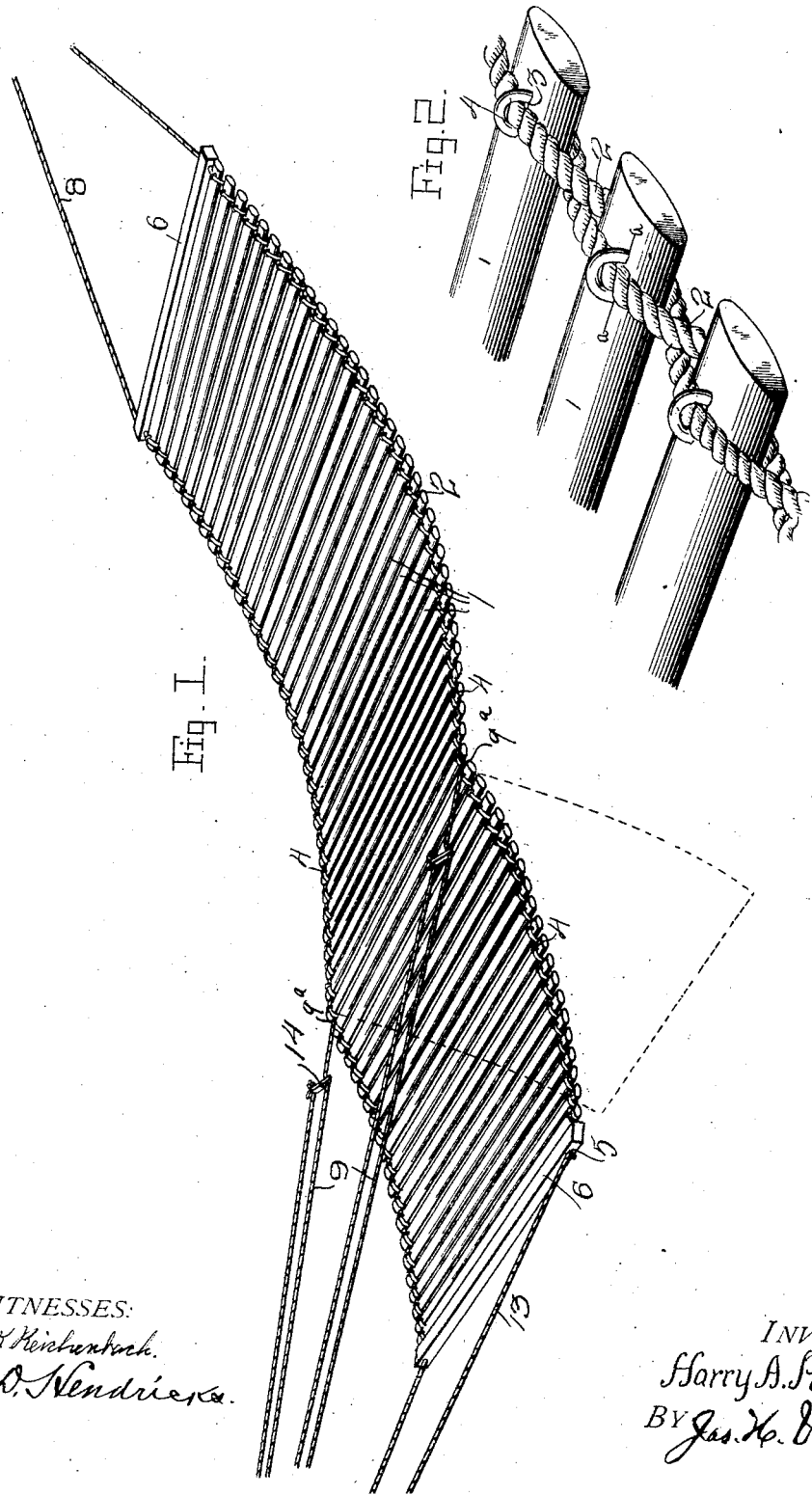
WITNESSES:
INVENTOR
Harry A. Randall.
BY Jas. H. Vermilya
Attorney

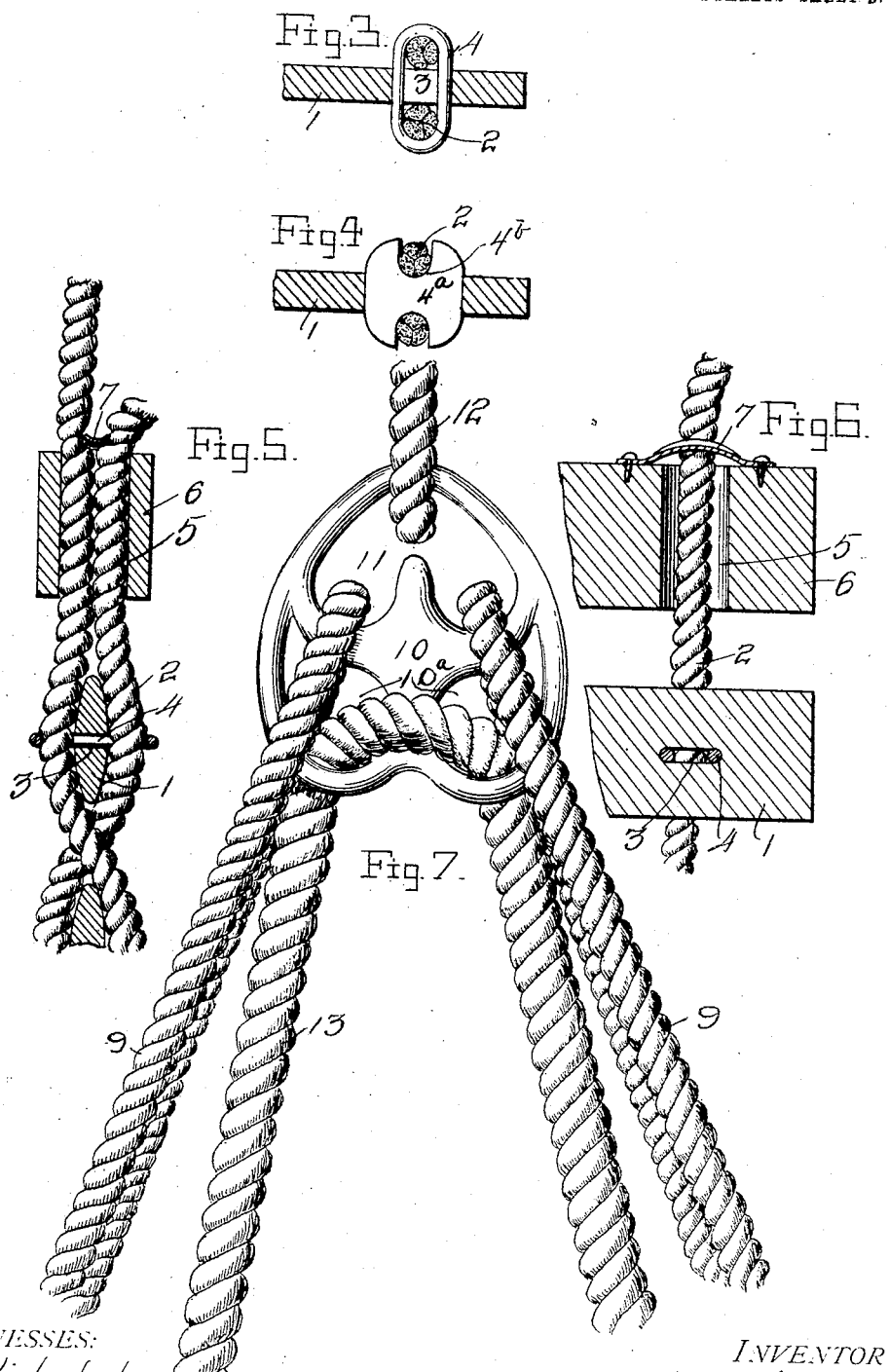

No. 777,919. Patented December 20, 1904.

UNITED STATES PATENT OFFICE.

HARRY ADDISON RANDALL, OF SOUTH HAVEN, MICHIGAN.

CONVERTIBLE HAMMOCK AND HAMMOCK-CHAIR.

SPECIFICATION forming part of Letters Patent No. 777,919, dated December 20, 1904.

Application filed April 7, 1903. Serial No. 151,512.

*To all whom it may concern:*

Be it known that I, HARRY ADDISON RANDALL, a citizen of the United States, and a resident of South Haven, county of Van Buren, State of Michigan, have invented a new and useful Improvement in Convertible Hammocks and Hammock-Chairs, of which the following is a full, clear, and exact description, reference being had to the accompanying drawings, making part of this specification.

My invention is an improved convertible hammock and hammock-chair; and it consists in the construction and combination of devices, substantially as hereinafter described.

In the accompanying drawings, Figure 1 is a perspective view of a hammock embodying my improvements, showing the same in use and in dotted lines showing the foot portion of the hammock-body lowered to convert the hammock into a hammock-chair. Fig. 2 is a detail perspective view showing the connections between the ropes and the cross-slats. Fig. 3 is a detail sectional view taken on the line $a\ a$ of Fig. 2. Fig. 4 is a similar view showing a modification. Figs. 5 and 6 are detail views showing the connection between the spreader and the hammock-body ropes. Fig. 7 is a detail view showing the suspending device to which the main and foot-rest ropes are adjustably connected.

The body of the hammock comprises a plurality of cross-slats 1 and longitudinally-disposed ropes or cords 2 of suitable size, which connect them together to render the hammock-body flexible. The ropes 2 are disposed near the ends of the cross-slats and are crossed between the slats, as shown in detail in Fig. 2, and thereby the slats are spaced uniformly an appropriate distance apart and are firmly clamped between and held by the said ropes. In practice I prefer to make the slats of suitable wood; but they may be made of any suitable material. Each slat is provided near its ends with transverse openings 3, in which are keepers 4, forming links through which the ropes are passed, said keepers projecting from opposite sides of the slats a sufficient distance to receive the ropes. These keepers prevent the ropes from becoming disengaged from the slats, as will be understood. They also permit the slats to play between the ropes. The forms of the keepers shown in detail in Fig. 3 are of oval or link shape and are movable endwise in the openings in the slats. The forms shown at $4^a$ in Fig. 4 are preferably made of wood, are also slidable longitudinally in the opening of the slats, and have notches $4^b$ in their ends, which project from the upper and lower sides of the slats to receive the ropes 2.

The end portions of the ropes 2 pass through and are slidable in transverse openings 5 in spreader-bars 6, which form the ends of the body of the hammock. On the outer sides of the said spreaders are secured, by means of screws, nails, or other suitable devices, the end portions of springs 7, which may in practice be rubber bands, which lie across the openings 5 and are connected to the ropes 2 frictionally by lying between them, as shown in Fig. 5, so that the ropes are yieldably attached to the spreaders. The springs by their tension pull endwise outwardly on the ropes 2 and keep said ropes under longitudinal tension at all times when the hammock is stretched and cause them to retain their clamping-grip upon the slats even when the hammock is not in use, and hence prevent casual displacement of the slats and their casual detachment from the ropes.

The head of the hammock is provided with a suspending-rope 8, which is attached to the head spreader-bar. Main suspending-ropes 9, which are each doubled, are each attached at one end, as at $9^a$, to one side of the body of the hammock at a suitable distance from the foot thereof. The bights of said ropes 9 are passed through openings 11 in a link device 10. A suspending-rope 12 is attached to the outer side of the link device. A foot-rope 13, which is doubled, has its ends attached to the end portions of the foot spreader-bar, and its bight is passed through openings $10^a$ in the link device. The free end of each rope 9 is slidably connected to that portion thereof which is attached to the body of the hammock, as by a key 14. By adjusting said keys on the said ropes 9 to let out or draw in upon the body of the hammock it may be raised or lowered with reference to the foot portion thereof, as indicated in Fig. 1, in which the foot portion of the hammock is shown in dotted lines in a relatively lowered position, so that the hammock may either be used as such or as a hammock-chair at will.

I do not desire to limit myself to the precise construction and combination of devices herein shown and described, as it is evident that modifications may be made therein without departing from the spirit of my invention and within the scope of the appended claim.

Having thus described my invention, I claim—

A hammock having cross-slats, connecting-ropes, a bar having openings in which the said ropes are slidable, and yieldable spring connections between the bar and said ropes to keep the latter under tension.

In testimony whereof I have set my hand, this 7th day of March, A. D. 1903, in the presence of two attesting witnesses.

HARRY ADDISON RANDALL.

Witnesses:
CHAS. G. SUNDQUIST,
FRANK S. RANDALL.